Jan. 29, 1935. LE ROY C. SCHENCK 1,989,213
SAFETY COVER LATCH
Filed Oct. 1, 1929 2 Sheets-Sheet 1
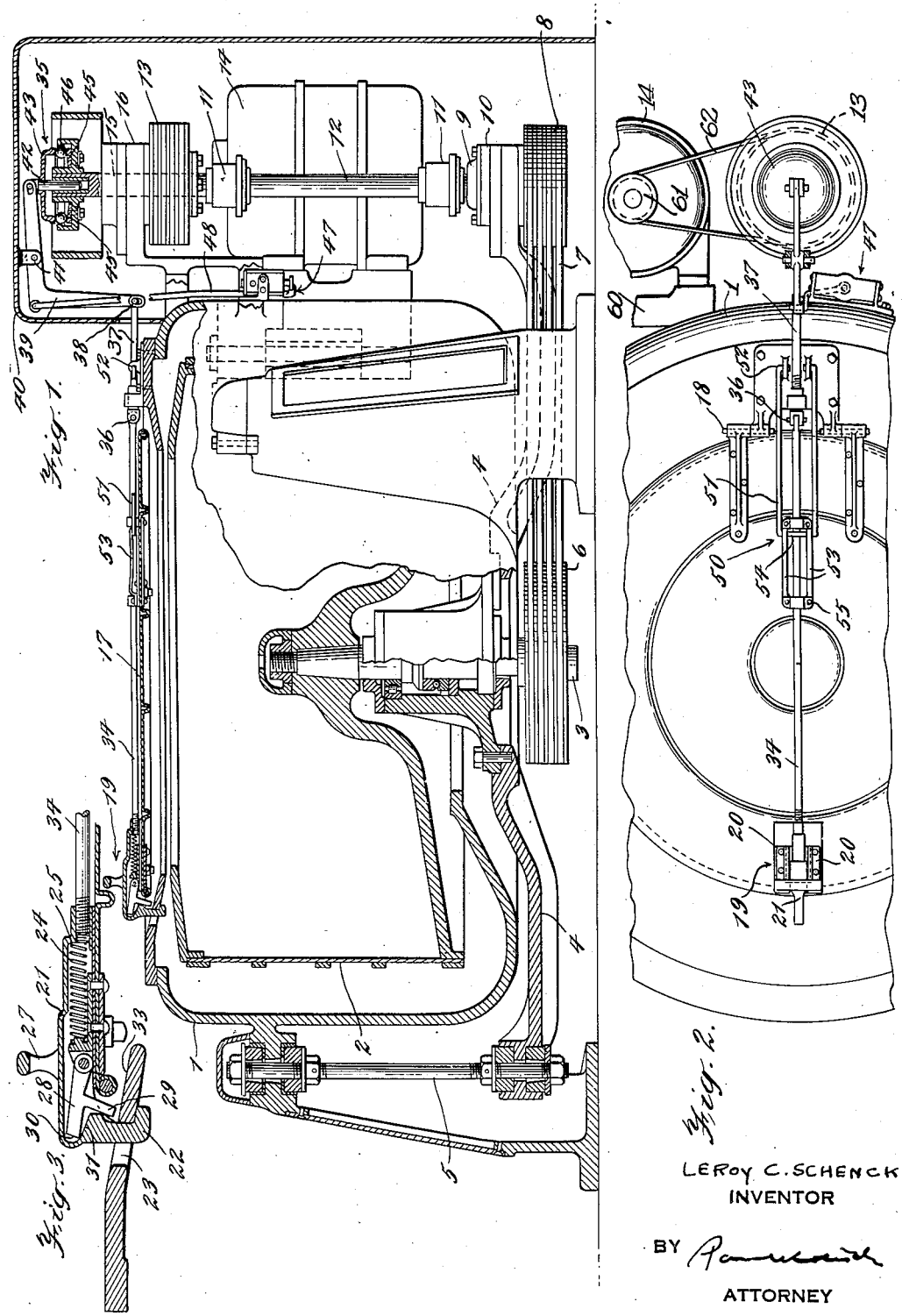
LEROY C. SCHENCK
INVENTOR
BY
ATTORNEY

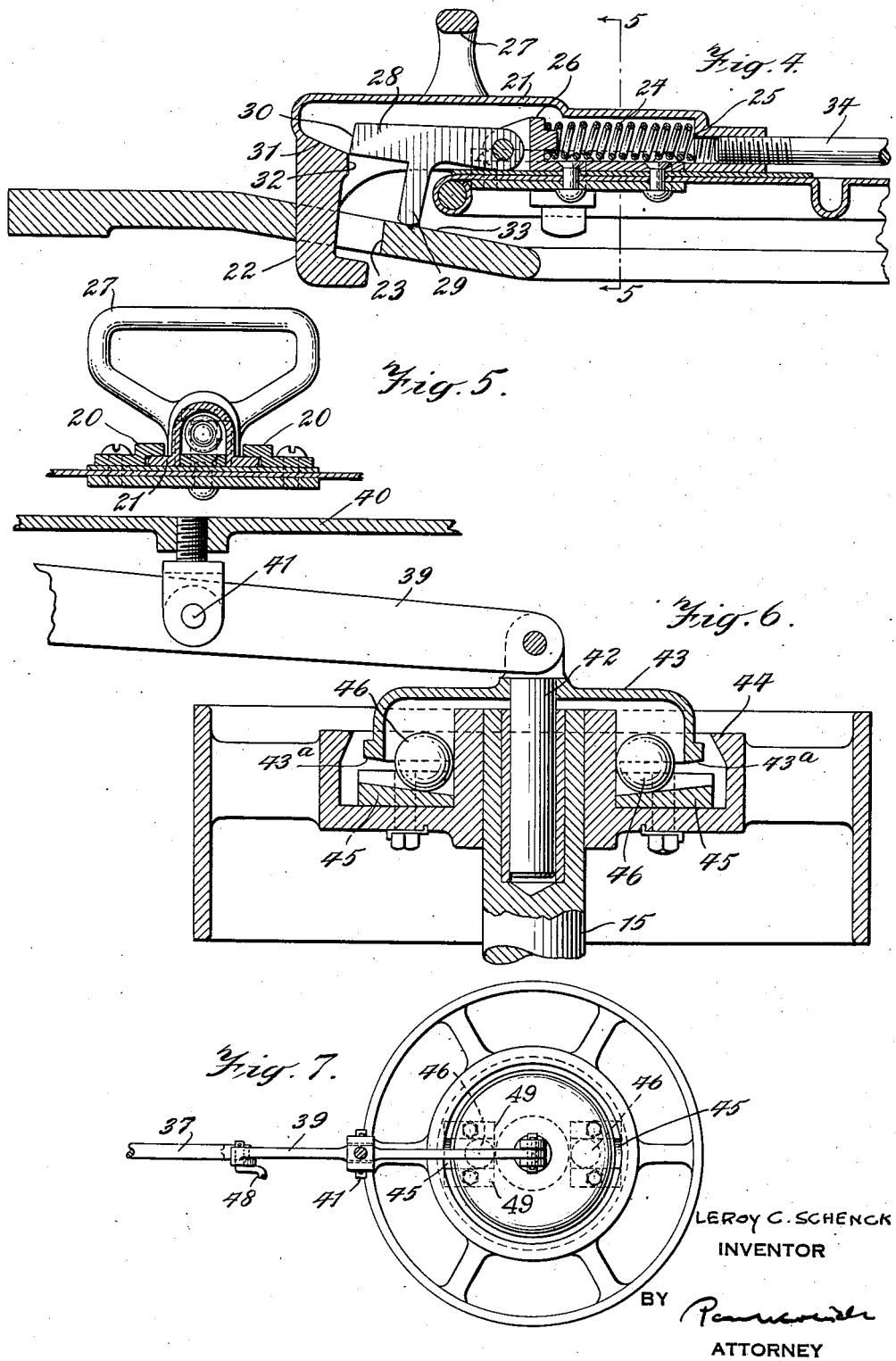

Patented Jan. 29, 1935

1,989,213

UNITED STATES PATENT OFFICE 1,989,213

SAFETY COVER LATCH

Le Roy C. Schenck, Moline, Ill., assignor, by mesne assignments, to American Machine and Metals, Inc., New York, N. Y., a corporation of Delaware Application October 1, 1929, Serial No. 396,437

13 Claims. (Cl. 192—136)

This invention relates to safety cover locks for centrifugal extractors and similar devices.

It is an object of this invention to provide an improved form of safety cover for centrifugal extractors, which is provided with locking means so arranged as to remain locked at all times when the machine is in operation.

More specifically, it is an object of this invention to provide a locking device for the cover of a centrifugal extractor which is furnished with a centrifugally controlled locking means so constructed as to operate at a very low speed.

A further object is the design of an improved form of centrifugal locking means which is responsive to slow speeds of rotation and which is adapted to be used with many different kinds of machines.

In accordance with my invention I provide a centrifugal locking means comprising a rotating member having a raceway therein which is inclined upwardly and outwardly from the center of rotation of said member, this raceway being adapted to carry a rolling element such as a ball or roller. When the shaft is rotated at even a slight speed, this rolling element, being under no restraint other than gravity, will roll outwardly and upwardly on the raceway, assuming a position against the outer edge of the raceway-carrying element. In this position the rolling element serves to prevent motion of an annular member, longitudinally of the rotating shaft. This movement is prevented by the annular member striking the rolling member; as the angle of inclination of the raceway is small, the annular member will be unable to move the rolling element out of its position, whereby the annular member will be prevented from motion. This centrifugal locking mechanism may be incorporated in a centrifugal extractor and suitable linkages interconnected between said means and a cover latching mechanism for the extractor.

For increasing the effectiveness of this centrifugal locking means, I find it preferable to mount it on a shaft which rotates at a higher rate of speed than that of the machine to be controlled. The reason for this is that, where it is desired, for example, to maintain the cover of a rotating machine locked until the machine has stopped, or substantially stopped, rotating, the centrifugal locking means will be controlled by a shaft rotating at a higher rate of speed.

The above mentioned and further objects and advantages will be made apparent in the following description and drawings.

In the drawings, Fig. 1 is a side elevation partly in section of a centrifugal extractor embodying my invention;

Fig. 2 is a fragmental plan view of the machine shown in Fig. 1;

Fig. 3 is a detail view of the cover latch of the machine showing the mechanism in locked position;

Fig. 4 is an enlarged view similar to Fig. 3, except that the latch is shown partially unlocked;

Fig. 5 is a sectional view taken along the lines 5—5 of Fig. 4;

Fig. 6 is an enlarged side elevation view of the centrifugal locking mechanism shown in unlocked position, which is its position when the cover is raised; and Fig. 7 is a plan view of the mechanism shown in Fig. 6.

Referring more particularly to the drawings, reference numeral 1 indicates the curb or housing of an extractor which may be constructed in accordance with the disclosure in my copending application Serial No. 337,346, filed Feb. 4, 1929. Within the housing is rotatably mounted a basket 2 which is supported by a driving shaft 3 journalled in a bearing plate 4 suspended from the curb 1 by means of links 5.

The shaft 3 carries a pulley 6 which is connected, by means of belts 7, to a pulley 8. The pulley 8 is mounted on a shaft 9 journalled in a bearing 10, which is also carried by the plate 4. Shaft 9 is coupled, through universal joints 11 and shaft 12, with a pulley 13, which is driven by an electric motor 14. The pulley 13 is mounted on a shaft 15 journalled in a bearing 16 carried by the curb 1.

Motor 14 is supported by bracket 60 on housing 1 and carries a driving pulley 61. Belts 62 extend between pulleys 61 and 13.

A cover 17 is provided for the housing and serves to prevent access to the rotatable basket 2. This cover is hinged to the housing at 18 and is provided with a latch 19. The latch comprises a pair of guide members 20 within which is slidably positioned a locking bolt 21. This bolt is provided with a downwardly projecting locking finger 22 which passes through an opening 23 in the top of the housing 1 and is held in locked position by a compression spring 24. This spring fits within a pocket 25 in the bolt and at one end thrusts against a stop 26, whereby the bolt is forced in a right-hand direction and finger 22 held in locked position, as shown in Fig. 3.

When it is desired to open the cover, the locking bolt is moved to the position shown in Fig. 4, by the handle 27, whereupon the finger 22 will be disengaged from the housing and the cover 17 will be permitted to rise. In order to hold the bolt 21 in unlocked position while the cover is open, a locking pawl 28 is furnished. This pawl is pivotally connected to the stationary member 26 and is provided with a downwardly projecting tail 29. When the cover 17 is in its closed position, the end 30 of the locking pawl rests upon an inclined face 31 of the bolt 21 whereby the tail 29 is maintained in a position free from the housing 1. When the bolt is withdrawn to the unlocked position, as shown in Fig. 4, the locking pawl is permitted to drop down, due to the inclination of the face 31, so that when the cover 17 is opened slightly, the end 30 of the pawl drops down into engagement with a shoulder 32 of the bolt 20, thereby holding the bolt in a left-hand unlocked position, as viewed in Fig. 4, against the compression of spring 24. Closing movement of the cover 17 causes the tail 29 of the pawl to strike against the housing at 33, thereby moving the pawl to an unlocked position and permitting the bolt to move to the right to a locked position, under the influence of spring 24. For automatically maintaining the bolt 21 in locked position, an operating rod 34 serves to connect the bolt with a centrifugal locking mechanism 35. The rod 34 is pivotally connected at 36 with a drag link 37 which in turn is pivotally connected at 38 with a bell crank 39. The bell crank is pivotally connected midway of one of its arms to a stationary support 40, at 41, and carries at its outer end a plunger 42. The plunger which is slidably positioned in an opening in end of shaft 15, has secured to it a cup or bell-shaped annular member 43. The bell 43 is of such dimensions as to be movable within a retaining cup 44 fastened to shaft 15 and responsive to longitudinal movement of the plunger 42 in the end of shaft 15. The cup 44 has within a set of inclined ball races 45, in which are loosely positioned a plurality of balls or rollers 46. When the shaft is stationary the balls 45 are held by gravity at the lowermost part of the race 45, which is that nearest the shaft 15.

As the shaft starts to revolve, the balls 46 are thrown outwardly by centrifugal force and thereby roll up the face of the inclined race 45 toward the outer edge thereof. Because of the small inclination of the race only slight centrifugal force is necessary to overcome gravity and cause the balls to take up the outward position. But a few revolutions per minute are therefore necessary. With the balls in the outer position, as shown in Fig. 1, the plunger 42 will be unable to move into the shaft 15, as the annular member or bell 43 will strike against the balls 46 which are in turn supported by the raceway 45. However, as soon as the speed of rotation of shaft 15 decreases to a sufficiently small value, a matter of a few revolutions per minute, the balls roll back toward the center of the race 45 and thereby remove themselves from the path of travel of the bell and permit plunger 42 to be thrust farther into the opening of shaft 15. It will therefore be seen that in order for the latch 19 to be moved to unlocked position, it is necessary that the shaft 15 either be stopped, or substantially stopped. When this condition obtains the latch handle 27 may be grasped and moved to the left-hand position, as shown in Fig. 4, carrying with it rod 34, thereby rocking the bell crank 39 in a clockwise direction and thrusting the plunger 42 into the opening in the shaft 15, the bell 43 travelling to the position shown in Fig. 6 past the balls 46 which are at the time at the lowermost portion of the race 45, near the shaft 15. On the other hand, when the shaft 15 is rotating at even a moderate rate of speed, the balls are thrown outward in the race into the path of movement of the bell 43, whereby rotation of the bell crank 39 and left-hand movement of the latch bolt 21 are prevented and the latch maintained in locked position. The lower edge of the bell 43 has an inclined surface 43ª parallel to the ball raceway to prevent the bell from forcing the balls towards the shaft. The outward movement of the balls is made possible by reason of the fact that the bell was raised simultaneously with the movement of the latch 21 to locked position by spring 24 when the cover was raised.

The extractor motor 14 may be provided with a control switch 47 which is connected by a link 48 with the bell crank 39 so that when the cover 17 is in open position, and the bell crank therefore rocked in a clockwise direction, the switch circuit is broken and current cut off from the motor. This arrangement will insure that the driving motor 14 cannot be operated when the cover 17 of the extractor is open and the basket 2 exposed.

The ball race 45 may either be of a circular form or may be arranged as shown in Fig. 7. In this figure the balls 46 are positioned in a race 45 having two guides 49 at the sides thereof, so that the ball may move only in a radial direction with respect to the shaft 15. In such a mechanism as this any number of balls desirable may be used. I find it advantageous, however, to use two placed diametrically opposite each other, as shown in Fig. 7.

The pivotal point of connection 36 between rod 34 and drag link 37 is so located that when the latch bolt 21 is moved to a left-hand position, the pivotal point 36 will be moved exactly in alignment with the hinge 18 of cover 17. This insures that when the cover is open no springing of the shaft 34 or cooperating parts, will occur. For supporting the cover 17 when it is in open position a brace mechanism 50 is used. This brace comprises a supporting arm 51 which has two legs with inwardly turned ends which engage projecting ears on the housing 1, at 52, to form a pivotal joint, and a combination guide and stop 53 which serves to maintain the end 54 of the support 51 in its proper sliding position. When the cover is fully open the end 54 of the support 51 engages the portion 55 of stop 53, thereby holding the cover in a position past the vertical and leaning against the support 51.

In operating the machine the cover 17 is shut, releasing the pawl 28 and permitting the spring 24 to force the latch to its locked position, shown in Fig. 3, at the same time raising the bell 43, whereupon the motor 14 may be energized by current from a source (not shown), in circuit with which is the safety switch 47. The motor thereupon drives the basket 2 through the pulleys 13, 8, 3 and belts 7. The opening of the cover is prevented by the moving of the balls 46 to the outward position, as shown in Fig. 1, wherein they are positioned directly in the path of movement of bell 43, preventing the bell crank 39 from being rotated and the latch bolt 21 from being moved to an unlocked position.

When it is desired to open the cover 17, the motor 14 is stopped. As soon as the shaft 15 comes to rest, or substantially so, the balls 45 roll down in the incline towards the shaft 15 and out of the path of movement of the bell 43. The latch bolt 21 may now be moved to the left by the handle 27 and the cover opened. As heretofore stated, when the cover is open the pawl 28 drops into engagement with the shoulder 32 of the latch bolt 21, thereby holding it in unclosed position. Upon closing of the cover the tail 29 of the pawl 28 strikes on the housing 1 at 33, thereby releasing the latching bolt and permitting it to slide to the right under the influence of spring 24 to a locked position.

It will be obvious to those skilled in the art that the invention is capable of a wide variety of modifications and adaptations and that the present disclosure is intended merely to illustrate its nature without limiting its scope which is defined in the claims.

What I claim is:

1. A centrifugal locking device comprising a vertically positioned rotatable shaft, a non-rotatable annular member arranged concentrically with respect to said shaft and adapted to move axially with respect thereto, a rotatable member mounted on and secured to said shaft adjacent to said annular member, a race-way in said rotatable member directed upwardly and outwardly from said shaft, and rolling means positioned in said race-way and adapted to prevent axial movement of said annular member when moved by centrifugal force to the outer end of said race-way.

2. In a laundry machine, a locking mechanism for a container having a hinged cover, a stationary member, a latch slidably positioned on said cover and having a locking finger adapted to engage said stationary member to lock said cover, spring means for holding said latch in locked position and a detaining pawl for holding said latch in unlocked position when said cover is open, said pawl having means for engaging said stationary member and releasing said latch responsive to shutting of said cover.

3. In a laundry machine, a locking mechanism for a container having a hinged cover, comprising a latch, spring means for urging said latch to a locking position, holding means responsive to the unlatching and opening of said container for holding said latch in unlocked position and means responsive to closing of said cover for releasing said holding means.

4. In a laundry machine, a rotatable container, a power drive shaft, means for coupling said drive shaft to said rotatable container in such manner that the drive shaft turns at a higher speed than said container, a housing for said container, a cover for said housing, a latch for maintaining said cover in closed position, and means for preventing unlocking of said latch while said container is in motion, said means comprising a member carried by said driving shaft, said member having a raceway therein inclined upwardly and outwardly from said shaft, a ball in said race-way, a second shaft journalled in an aperture in the end of said driving shaft, a bell-shaped member carried by said second shaft, said member being of such dimensions as to strike said ball when it is at the outermost end of said raceway but not when it is at the end of the raceway near the drive shaft, and a pivotally mounted lever having one end connected to said second shaft and the other end interlinked with said latch.

5. A container, a cover therefor, and a latch for maintaining said cover in closed position, said latch comprising a locking member movable longitudinally in the plane of said cover to an unlocked position, a spring for holding said latch in locked position, and a gravity operable dog for holding said latch in unlocked position.

6. A laundry machine comprising a housing, a cover for said housing, a rotatable power driven shaft and means for locking said cover so that it cannot be opened until cessation of rotation of said shaft, said means comprising a manually operable locking latch, a non-rotating member connected to the latch and movable in response thereto toward a rotatable member connected to said power driven shaft, said rotatable member containing radial inclined race ways, and centrifugal means intermediate said non-rotating and said rotating member, adapted to assume at a predetermined speed a radial position preventing the approach of the non-rotating and the rotating members.

7. In a centrifugal mechanism, a vertical shaft, a circular member carried by said shaft, said member having a channel therein, said channel comprising a race-way inclined upwardly and outwardly from said shaft, a ball in said race-way, a member mounted for movement towards and away from said circular member, said two members being relatively movable both axially and rotatably and said circular member being so positioned with respect to said race-way that when the ball is at the outer side of the race-way, movement of said member is prevented thereby, but when the ball is at the inner side of the race-way movement of the member is permitted, said movable member comprising a bell-shaped device secured to a stem slidably positioned in an aperture in the end of said vertical shaft.

8. In a centrifugal mechanism, a vertical shaft, a circular member carried by said shaft, said member having a channel therein, said channel comprising a race-way inclined upwardly and outwardly from said shaft, a ball in said race-way, a member mounted for movement towards and away from said circular member, said two members being relatively rotatable and said circular member being so positioned with respect to said race-way that when the ball is at the outer side of the race-way, movement of said member is prevented thereby, but when the ball is at the inner side of the race-way movement of the member is permitted, a container, a cover therefor, a latch movable substantially in the plane of said cover for locking said cover, and a bell crank operatively interposed between and connected to said locking means and said movable member.

9. In a centrifugally controlled locking device, in combination, a latch, a rotatable shaft, and means for preventing unlocking of said latch comprising a member carried by said shaft and having a raceway therein inclined upwardly and outwardly from said shaft, a ball in said raceway, a second shaft journaled in an aperture in the end of said first shaft, a bell-shaped member carried by said second shaft, said bell-shaped member being adapted to strike said ball when the ball is at the outer end of said raceway but not when it is at the inner end of said raceway, and a pivotally mounted lever having one end connected to said second shaft and the other interlinked with said latch.

10. In a centrifugal extractor, in combination, a manually operable latch, a vertical shaft, and means for preventing unlocking of said latch comprising a member carried by said shaft and having a raceway therein inclined upwardly and outwardly from said shaft, a ball in said race-way, a member journaled upon the upper end of said shaft, a bell-shaped member carried by said journaled member, said bell-shaped member being adapted to strike said ball when the ball is at the outer end of said raceway but not when it is at the inner end of said raceway, and a pivotally mounted lever having one end connected to said second shaft and the other interlinked with said latch to prevent manual unlocking of said latch when said ball is in its said outer position.

11. A safety-lock mechanism for centrifugal machines including in combination a casing, a cover therefor, a basket and basket shaft rotatable within the casing, a driving member for the basket shaft connected to rotate at a higher speed than the shaft, a latch for locking the cover to the casing in closed position and means for preventing unlocking of the cover when the basket is rotating comprising centrifugal latch-controlling means responsive to the rotation of said high speed driving member.

12. A safety-lock mechanism for centrifugal machines including in combination a casing, a cover therefor, a basket rotatable within the casing, a latch for locking the cover to the casing in closed position, means for unlocking the latch and raising the cover, and means cooperating therewith for holding the latch in cover-unlocking position when the cover is open, said cooperating means being released by closing the cover to permit locking of the latch.

13. A safety-lock mechanism for centrifugal machines including in combination a casing, a casing cover, a basket rotatable within the casing, a drive shaft drivingly connected to the basket, a motor for driving the basket shaft, speed-reducing drive connections between the motor shaft and the basket shaft, a latch for locking the casing cover in closed position, and speed-responsive means controlled by the speed of the motor shaft for preventing unlocking of the casing cover until the basket stops rotating.

LE ROY C. SCHENCK.